United States Patent Office 3,708,470
Patented Jan. 2, 1973

3,708,470
SEALANTS
Colin David Hall, Portsmouth, England, assignor to Ralli Bondite Limited, Portsmouth, England
No Drawing. Filed Sept. 15, 1970, Ser. No. 72,858
Claims priority, application Great Britain, June 23, 1970, 30,539/70
Int. Cl. C08c 11/22, 11/72; C08d 9/00, 13/00
U.S. Cl. 260—23.7 M                 9 Claims

ABSTRACT OF THE DISCLOSURE

A sealant is made by compounding a gelled drying or semi-drying oil with an elastomer and vulcanizing the mixture. The gelling of the oil may be accomplished during the compounding step by selecting a gelling agent effective at the compounding temperature.

---

The present application relates to sealant compositions, and to methods of making the same by compounding oil with elastomer.

In U.S. Pat. No. 3,553,125, granted to Alan Watters on Jan. 5, 1971, there is described a method of making sealants by pre-gelling an oil using for example a suitable grade of bentonite as gelling agent, and then compounding the gelled oil with the elastomer and vulcanizing the elastomer in the resulting mixture. Conveniently, the mixture is compounded in two separate parts which together contain all the ingredients necessary for room temperature vulcanization, each part omitting one essential element in the vulcanizing system so that each of the two parts has, by itself, a substantial shelf life. A cold vulcanizing mixture is then produced by blending the two parts together the formulation preferably being done so that this blending is effected with equal parts of the two.

In the formulations just described the preferred oils were mineral oils, and although reference was made to the incorporation of a drying or semi-drying oil this was suggested to be used only in minor proportion. I have now discovered that valuable sealant compositions can be obtained if the proportion of drying or semi-drying oil is considerably increased so that it becomes the principal or even the sole oil in the mixture. Moreover, I have found that, where the drying or semi-drying oil is to be gelled, it is possible to accomplish this during the compounding of the oil with the rubber, by selecting a gelling agent which is effective at the compounding temperature.

Where, as will normally be the case, the elastomer is compounded in two separate parts, one containing a curative system for the elastomer and the other containing a room temperature accelerator for the curative system, the drying or semi-drying oil may be contained in either or in both of the parts.

The drying and semi-drying oil used in accordance with the invention has several advantages. It plasticises the rubber very effectively, it does not need to be pre-gelled, it gives a more stable formulation especially in relation to the part containing the room temperature accelerator, and it facilitates the attainment of a resilient rubber compound of a desired degree of softness when fully cured (20–60 I.R.H.D. hardness) whilst having a paste-like consistency before curing. The reason for all these virtues of the drying and semi-drying oils is not understood. It is believed that they are in part associated with the fact that the oil is free from sulphur, but it is noted that even sulphur free grades of mineral oil do not give so stable a formulation. Moreover, the use of the higher proportions of semi-drying vegetable oils not only imparts a good shelf life but also results in a cured sealant with improved long term ageing properties which, of course, is of the greatest importance since one of the major uses of the sealant is as a glazing compound on the outer face of large buildings including high rise buildings where low maintenance costs are imperative.

The vegetable oils, especially semi-drying vegetable oils, may be pre-gelled if desired but, as already mentioned, may be gelled during the mixing cycle if a suitable gelling agent such as colloidal silica is employed. A suitable grade of colloidal silica is available commercially under the trade name "Aerosil" (registered trademark). This forms a gel at the low temperature encountered during the mixing cycle, which will generally be of the order of 20–40° C. Aluminium stearate or Bentone (aminated bentonite clay) do not function if added in this manner as higher temperatures are required to form a gel and in the case of Bentone a shearing action such as is encountered in a colloid mill is normally required.

When the vegetable oil is used by itself, a gelling agent will be employed either to pre-gel the oil or to gel it during compounding. When both mineral oil and semi-drying oil are employed, either or both may be gelled. Thus, when the semi-drying oil is pre-gelled or is gelled in the mixing step it is possible to add substantial quantities of ungelled mineral oil without oil exudation from the cured sealant. On the other hand, when substantial quantites of pre-gelled mineral oil are employed, with a correspondingly lesser amount of semi-drying oil, the latter may not require to be gelled.

Various drying or semi-drying vegetable oils may be employed, but soyabean oil is preferred. It is particularly good properties as a softener or plasticiser, and may be used to formulate a soft gunnable sealant having higher penetration values than the corresponding sealant using mineral oil, without leading to oil exudation of the cured sealant.

The following table illustrates three formulations of two-part sealants in which part A contains a curative system for the elastomer and part B contains room temperature acceletaror. In use, equal portions of parts A and B will be blended together to provide a gunnable sealant.

| | Formulation (parts by weight) | | | | | |
|---|---|---|---|---|---|---|
| | 1 | | 2 | | 3 | |
| Component | A | B | A | B | A | B |
| Vulcanisable elastomer | 100 | 100 | 100 | 100 | 100 | 100 |
| Inertfiller | 770 | 800 | 900 | 900 | 500 | 500 |
| Antioxidant | 3 | 3 | 3 | 3 | 4 | 4 |
| Gelled mineral oil | 240 | 70 | 90 | 80 | | |
| Naphthenic oil E40 | | | | | 80 | 80 |
| Paraffinic oil WT8 | | | | | 80 | 80 |
| Curative system | 72 | | 54 | | 96 | |
| Room temperature accelerator | | 30 | | 30 | | 48 |
| Soya bean oil | | 180 | 294 | 228 | 420 | 420 |
| Silica (Aerosil RTM) | | | 36 | | 70 | 70 |

The elastomer, filler, antioxidant, curative system and accelerator system, as set out in the table and generally, are as described in U.S. Pat. No. 3,553,125. Other ingredients which may be incorporated include a small proportion of micro-crystalline wax to improve the ageing characteristics, stearic acid as activator for the curing system, pigment when desired, fibrous filler such as asbestos to improve the slump resistance, and a tackifying resin such as hydroabietyl alcohol to improve the adhesion.

Referring to the table, formulation No. 1 is an example of a composition which, in the unmixed state, is a moderately firm dough but when cured produces a composition of 60–70° Shore hardness. Formulation No. 2 is an example of a composition which in the unmixed state is a soft dough which can be handled like a conventional glazing compound, and yet will vulcanize to give a cured composition of 30–40° Shore hardness. Formulation No. 3 is an example of a composition which, in the unmixed state, is even less stiff, having the character of a paste but which will cure to give a cured composition of 20–30° Shore hardness.

A further advantage of the invention is that it enables the proportion of oil in the sealant to be increased relative to the elastomer. Thus, a preferred proportion of oil to 100 parts of elastomer is in the range 150 to 500 parts by weight. The proportion of curative material will of course depend on the nature of the materials chosen. The amounts of filler and antioxidnat may be as before, namely 300–3000 parts and 2–8 parts respectively.

I claim:

1. A method of forming a sealant composition comprising an elastomer component and an oil component said oil component comprising a major proportion of a member of the group consisting of drying and semi-drying oils, said method comprising mixing said oil with a gelling agent which is effective at the compounding temperature, forming a gel of at least a part of said oil and compounding or intimately blending said gel with said elastomer.

2. A method according to claim 1 wherein said gelling agent is of a type which is effective to gel said oil at the temperature at which compounding is carried out, and said gelling and compounding are thereby effected concurrently.

3. A method according to claim 1 wherein said oil component comprises a minor proportion of a mineral oil and said mineral oil is gelled with said gelling agent prior to compounding the gel with said elastomer component.

4. A method according to claim 3 wherein said major proportion of oil is blended with the other compounding ingredients including the pre-gelled mineral oil without further addition of a gelling agent.

5. A method according to claim 3 wherein said compounding ingredients include a further gelling agent effective to gel said major proportion of oil during the blending together of said ingredients.

6. A method according to claim 1 which comprises intimately blending together compounding ingredients consisting essentially of cross-linking elastomer, inert filler, soybean oil, colloidal silica gelling agent, and a component of a cold cross-linking system for the elastomer.

7. A method according to claim 1 which comprises intimately blending together compounding ingredients consisting essentially of cross-linking elastomer, inert filler, soybean oil, a minor proportion of mineral oil, colloidal silica gelling agent and a component of a cold cross-link system for the elastomer.

8. A method according to claim 1 in which said composition is compounded in two separate forms, one including a curative system for the elastomer and the other including a room temperature accelerator for the elastomer said two forms of the composition being effective when blended together to provide a room temperature curing sealant.

9. A sealant composition comprising, by weight, 100 parts of a cross-linking elastomer, 160–600 parts of an oil, 300–3000 parts of an inert filler, and 2–8 parts of antioxidant, part at least of said oil being in the form of a gel, said gel comprising a mixture of said oil part and a gelling agent, a major proportion of said oil being selected from the group consisting of drying and semi-drying oils, said composition further containing cold cross-linking material selected from the group consisting of curative material for the elastomer and room temperature accelerator for said elastomer.

References Cited

UNITED STATES PATENTS 3,553,125　1/1971　Watters _____ 260—23.7
3,400,090　9/1968　Maslow _____ 260—23.7

OTHER REFERENCES

Damusis, Sealants pp. 270–282 (1967).

DONALD E. CZAJA, Primary Examiner

D. J. BARRACK, Assistant Examiner

U.S. CL. X.R.

260—27 BB, 28.5 B, 33.6 AQ, 34.2, 41.5 R, 41.5 A, 752, 754, 757, 759